(12) United States Patent
Harland et al.

(10) Patent No.: US 10,911,405 B1
(45) Date of Patent: Feb. 2, 2021

(54) SECURE ENVIRONMENT ON A SERVER

(71) Applicant: Amazon Technologies, Inc., Seattle, WA (US)

(72) Inventors: Jason Alexander Harland, Seattle, WA (US); Anthony Nicholas Liguori, Bainbridge Island, WA (US); Darin Lee Frink, Lake Tapps, WA (US); Nafea Bshara, San Jose, CA (US); Ziv Harel, Kibbutz Megiddo (IL); Matthew Shawn Wilson, Bainbridge Island, WA (US); Yotam Admon, Zur Hadasa (IL)

(73) Assignee: Amazon Technologies, Inc., Seattle, WA (US)

( * ) Notice: Subject to any disclaimer, the term of this patent is extended or adjusted under 35 U.S.C. 154(b) by 451 days.

(21) Appl. No.: 15/824,896

(22) Filed: Nov. 28, 2017

Related U.S. Application Data

(60) Provisional application No. 62/539,426, filed on Jul. 31, 2017.

(51) Int. Cl.
*H04L 29/00* (2006.01)
*G06F 17/00* (2019.01)
*H04L 29/06* (2006.01)
*H04L 12/813* (2013.01)

(52) U.S. Cl.
CPC ......... *H04L 63/0227* (2013.01); *H04L 47/20* (2013.01); *H04L 63/1441* (2013.01); *H04L 63/12* (2013.01); *H04L 63/20* (2013.01)

(58) Field of Classification Search
CPC . H04L 63/0227; H04L 63/1441; H04L 47/20; H04L 63/12; H04L 63/20; H04L 63/00; H04L 63/14; H04L 63/18; H04L 63/0236; H04L 63/0245; H04L 63/0254; H04L 63/0263; H04L 63/02; G06F 2009/45587; G06F 13/00; G06F 13/14;
(Continued)

(56) References Cited

U.S. PATENT DOCUMENTS

| 8,218,538 B1 * | 7/2012 | Chidambaram .... H04L 47/6205 370/386 |
| 8,850,060 B1 * | 9/2014 | Beloussov .............. H04L 63/20 709/235 |
| 9,207,882 B2 * | 12/2015 | Rosset .................. G06F 9/4405 |

(Continued)

*Primary Examiner* — Ahmed Elallam
(74) *Attorney, Agent, or Firm* — Kilpatrick Townsend & Stockton LLP

(57) ABSTRACT

Disclosed herein are techniques for maintaining a secure environment on a server. In one embodiment, the server includes a baseboard management controller (BMC), a first Ethernet port coupled with an adapter device network comprising a plurality of adapter devices, and a master adapter device including a second Ethernet port and a network switch, the network switch being controllable to be selectively coupled with at least one of the BMC, the first Ethernet port, or the second Ethernet port. The master adapter device may receive a network packet from at least one of: the first Ethernet port, the second Ethernet port, or the BMC, and determine, based on a forwarding policy, whether to forward the network packet. Based on a determination to forward the network packet, the master adapter device may determine a destination, and control the network switch to transmit the network packet to the destination.

22 Claims, 8 Drawing Sheets

(58) Field of Classification Search
CPC .............. G06F 21/53; G06F 9/45541; G06F 2009/45595
See application file for complete search history.

(56) References Cited

U.S. PATENT DOCUMENTS

| | | | |
|---|---|---|---|
| 9,300,633 B2* | 3/2016 | Acharya | H04L 61/2575 |
| 9,454,403 B2* | 9/2016 | Davis | H04L 45/00 |
| 9,634,948 B2* | 4/2017 | Brown | H04L 63/0245 |
| 9,756,015 B2* | 9/2017 | Itskin | G06F 9/45558 |
| 9,906,493 B1* | 2/2018 | Rodgers | H04L 63/0884 |
| 9,967,288 B2* | 5/2018 | Hugenbruch | G06F 9/45558 |
| 10,237,240 B2* | 3/2019 | Phillips | H04L 63/1433 |
| 10,348,767 B1* | 7/2019 | Lee | H04L 63/029 |
| 10,374,885 B2* | 8/2019 | Liguori | H04L 67/42 |
| 10,382,396 B2* | 8/2019 | Itkin | H04L 63/20 |
| 10,382,401 B1* | 8/2019 | Lee | H04L 12/4633 |
| 10,430,225 B1 | 10/2019 | Harland | |
| 2011/0022812 A1* | 1/2011 | van der Linden | G06F 9/5077 711/163 |
| 2015/0304233 A1* | 10/2015 | Krishnamurthy | H04L 47/762 709/226 |
| 2017/0116022 A1* | 4/2017 | Khalid | G06F 8/61 |
| 2018/0024537 A1* | 1/2018 | Chauvet | G06F 11/3013 718/104 |
| 2018/0165455 A1* | 6/2018 | Liguori | G06F 21/575 |

* cited by examiner

SECURE ENVIRONMENT ON A SERVER

CROSS-REFERENCE TO RELATED APPLICATIONS

This application claims priority to and the benefit of U.S. Provisional Application No. 62/539,426, filed Jul. 31, 2017, and entitled "SECURE ENVIRONMENT ON A SERVER," the content of which is herein incorporated by reference in its entirety.

BACKGROUND

Many organizations provide computing services over a plurality of communication networks. The computing services may include, for example, network-based services such as storage or servers that can be provided over the Internet to different clients. In some cases, servers may be rented out to clients based on need or usage.

BRIEF DESCRIPTION OF THE DRAWINGS

Various embodiments in accordance with the present disclosure will be described with reference to the drawings, in which.

DETAILED DESCRIPTION

Figure 1:
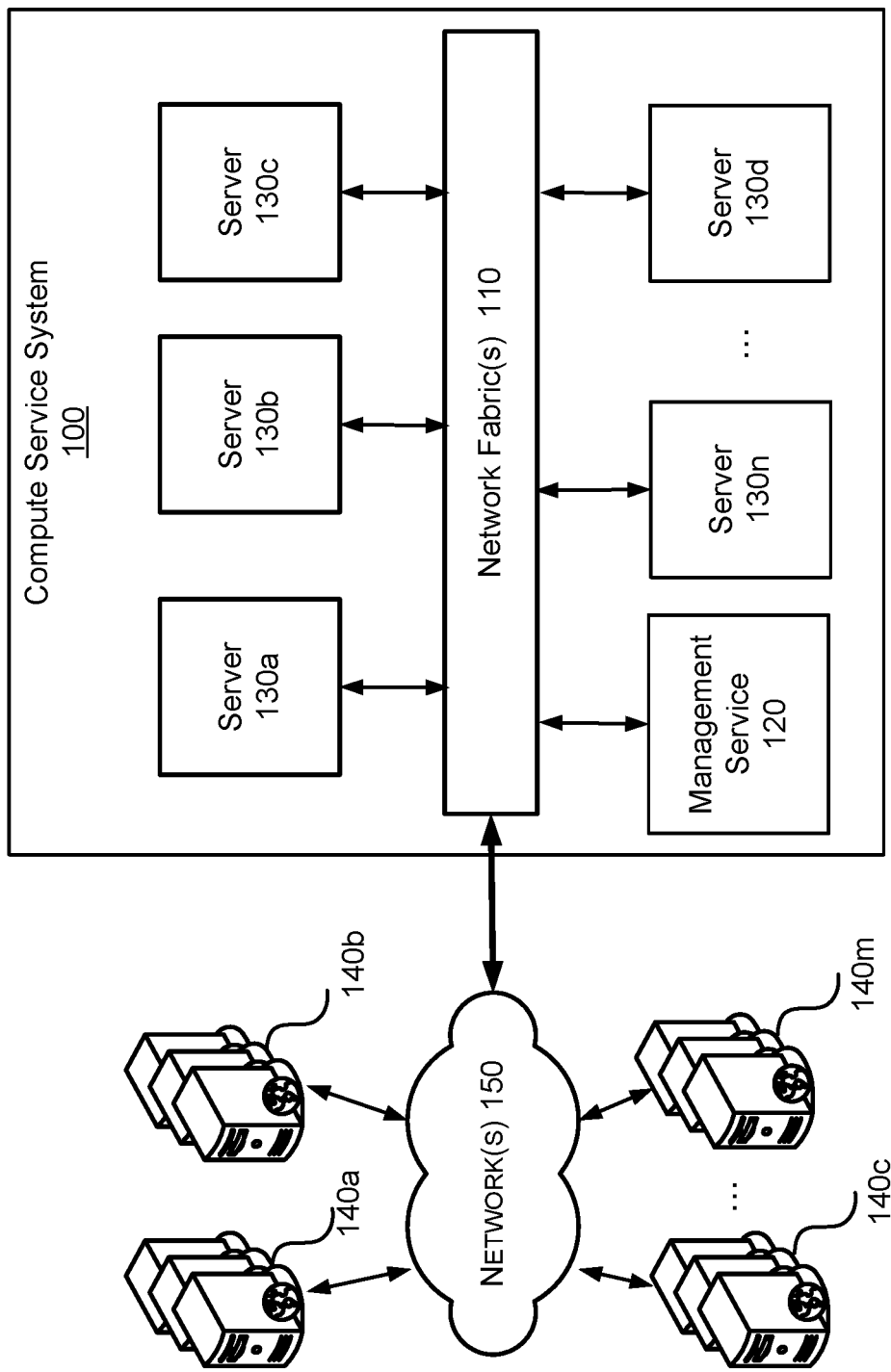
FIG. 1 illustrates an example compute service system in a network-based service environment, according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware).

Typically, the operator of the compute service uses its own virtualization system (e.g., a hypervisor or virtual machine monitor) on the servers and the clients only receive access to the instances. In some cases, a client may prefer to run software directly on the server's hardware (e.g., without a virtualization system) or use its own virtualization system to instantiate its own virtual machines as needed. For example, a client may want to use a customer hypervisor, make specific changes to a commercially available hypervisor, or prefer one hypervisor over another, e.g., Microsoft Hyper-V® over VMware vSphere® or open-source Kernel-based Virtual Machine (KVM). In addition, in a virtualized compute service system, performance degradation may occur due to the introduction of a hypervisor layer. While the hypervisor enables the visibility, flexibility, and management capabilities required to run multiple virtual machines on the same resources, it also creates additional processing overhead and may not integrate with tools the user wants to use with the hypervisor. Therefore, bare-metal instances, in which the customer is granted direct access to the hardware instead of through a hypervisor, may avoid the additional processing overhead caused by hypervisor, thereby improving performance.

However, a bare-metal environment may pose a security risk. The customer, with direct access to the hardware, could potentially damage the hardware. For example, a customer may be able to interfere with the management or configuration of the hardware components of the server, making the server unavailable or less useful to other customers.

Embodiments of the present disclosure relate to maintaining a secure environment on servers in a compute service system, where a secure internal management network is provided to connect components of the server for transmission of data, such as management and configuration data. More specifically, a server may comprise a processor, a baseboard management controller (BMC), and an adapter device network comprising a plurality of adapter devices for interfacing with certain hardware resources (e.g., storage, networking, etc.). The server may include an internal Ethernet network to connect between the BMC and the adapter device network to transmit management and configuration data. The internal Ethernet network server may be managed by a master adapter device, which allows entry of network packets into the internal Ethernet network only from a predetermined set of external sources (e.g., external data network, external management service network, etc.), and reject network packets from, for example, customers. The master adapter device may also prevent certain types of internal network traffic from reaching the BMC. As a result, the server components can be isolated and protected from potential threats.

FIG. 1 illustrates an example compute service system 100 in a network-based service environment, according to certain aspects of the present disclosure. In the network-based service environment, one or more clients may utilize client devices 140a-140m (collectively, client devices 140) to access compute service system 100 via one or more networks 150. For example, client devices 140 may access compute service system 100 using a web browser, a command line interface, or a service API. Client devices 140 may include any appropriate device operable to send and receive requests, messages, or other information over an appropriate network 150 and convey information back to a client of the device, such as, but not limited to, a mobile phone, a smart phone, a Personal Digital Assistant (PDA), a laptop computer, a desktop computer, a thin-client device, a tablet, an electronic book (e-book) reader, etc.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk®.

Compute service system 100 may include a management service 120 and a plurality of servers 130a, 130b, 130c, 130d, . . . , and 130n (collectively, servers 130) in a distributed computing environment. Management service 120 and servers 130 may be communicatively coupled to one or more network fabrics 110, which may be connected to networks 150 through, for example, a high speed network connection, such as InfiniBand, Data Center Ethernet (DCE), gigabit Ethernet, fiber channel, or Fiber Channel over Ethernet (FCoE) etc. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers, arranged in a cluster as a server farm, or as individual servers not associated with one another. These servers may be configured to host instances. In some implementations, each server of servers 130 may have identical or similar hardware resources. In some implementations, servers 130 may include a plurality of different types of servers that may have different resources and/or configurations.

Management service 120 may be a server or platform that is configured to manage a pool of heterogeneous resources (e.g., servers or specialized hardware resources), provide access to clients and end users, monitor security, and manage resource allocation. For example, management service 120 may receive requests from client devices 140 and select one or more servers 130 to provision the requested instance based on the specific request from the client. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

As described above, client devices 140 may request different types of instances (e.g., virtual machines or servers) from compute service system 100. For example, in some cases, a client may request an instance to perform complex computational workloads, such as batch processing, distributed analytics, high performance scientific or engineering applications, gaming, or video-encoding. In some cases, a client may request an instance for applications sensitive to network performance.

In some cases, a client may request a specific system hardware configuration. For example, the client may specify the number of processor cores, the size of the memory, the size of the storage device (e.g., a solid state drive (SSD)), and/or the operating system or Virtual Machine Monitor (VMM, i.e., hypervisor) needed for the applications. In some cases, the client may select a type of instance from multiple types of instances offered by the compute service system. For example, a computer service provider may offer different types or families of instances based on compute, memory, and storage capabilities, where different types of instances may provide different capabilities on computing performance, I/O performance, memory size and performance, storage size and performance, network performance, and graphic processing performance. And, in some cases, the client may request a particular operating system or hypervisor to run on the server, such as Microsoft Windows®, Linux, Microsoft Hyper-V®, Xen®, or VMware vSphere®. In some cases, the client may request a specific type of hardware, such as GPUs or SSDs. As such, in embodiments of the present disclosure the compute service provider may offer one or more "bare-metal" instance types. The bare-metal instance types can have differing combinations of hardware.

In some cases, a client's workloads and applications may demand higher performance than the virtualization layer allows, or the client may want to use a different virtualization system on hardware managed by the compute service provider. The client may rent a server as a bare-metal instance and use its own operating system on the server, in order to remove the hypervisor and the performance impact caused by virtualization. The hardware of the bare-metal instance may be fully dedicated to the client, including any additional storage, during the time period that the sever is rented to the client.

In response to web-service requests for a bare-metal instance from a client, management service 120 may select one or more servers to allocate to the client. For example, in implementations where the servers may have different hardware resources, management service 120 may select a server that best matches the requirement of the client-requested instance with minimum extra resources. In implementations where all servers have the same or similar hardware resources, management service 120 may randomly select any available server, or a cluster of available servers that are closely located. In some implementations, management service 120 may select a server that is capable of provisioning a bare-metal instance.

Figure 2:
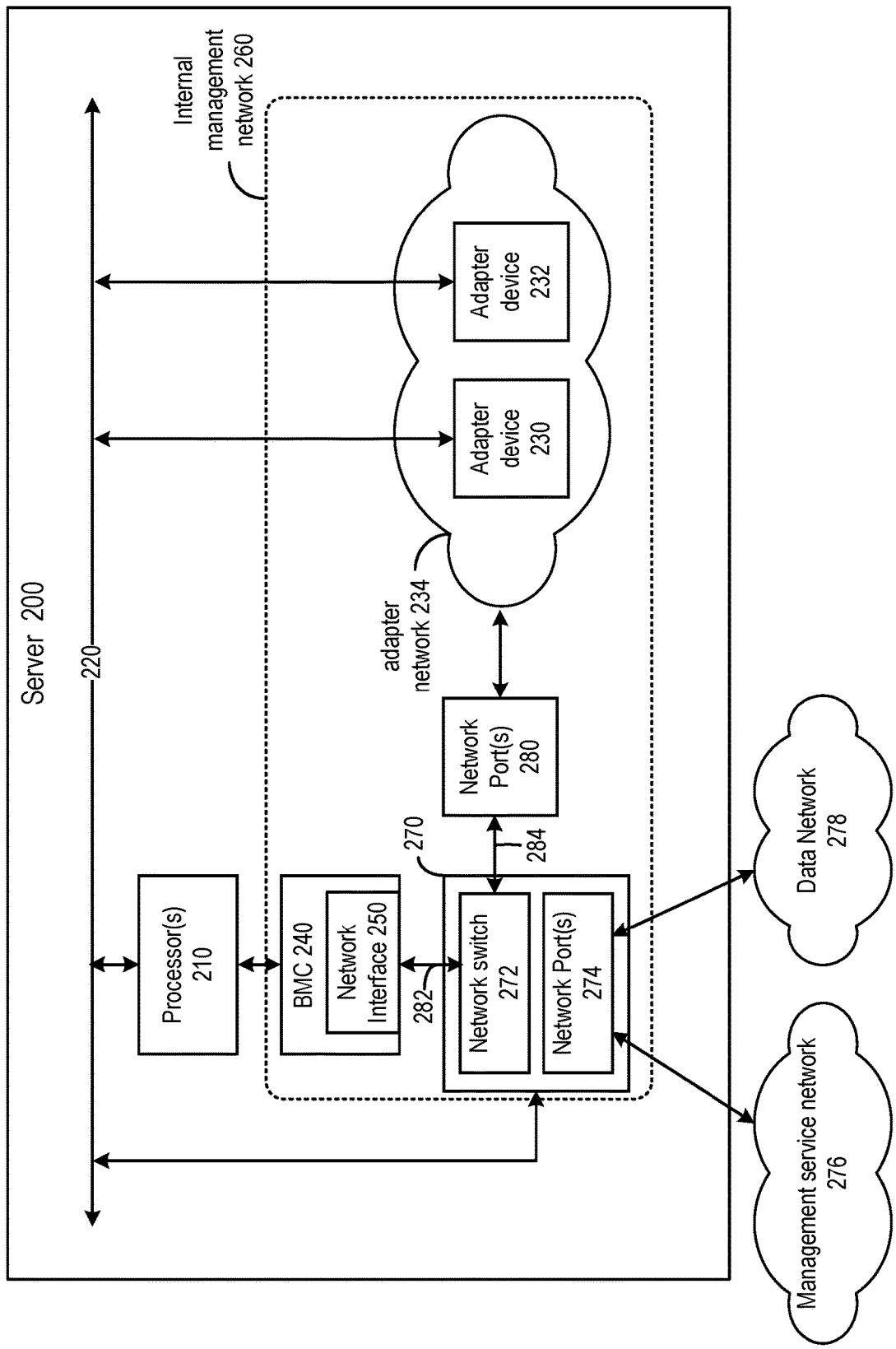
FIG. 2 is a simplified block diagram of an example server in a compute service system, according to certain aspects of the present disclosure.

FIG. 2 is a simplified block diagram of an example server 200 in a compute service system, according to certain aspects of the present disclosure. Many components or modules of server 200 are omitted in FIG. 2 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

In an illustrative embodiment, server 200 may be associated with various hardware components, software components, and respective configurations that facilitate the execution of client applications. In some implementations, server 200 may provide a multi-tenant platform to multiple clients through multiple adapter devices. In some embodiments, server 200 may be dedicated to a client at a given time, while no other client may have access to server 200 at the same time.

Server 200 may be a server, for example, an x86 server. Server 200 may include one or more processor(s) 210, which may include, for example, one or more x86 processor cores, or other circuits capable of executing machine-readable instructions. In some embodiments, processor(s) 210 may also include GPUs. Processor(s) 210 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in processor(s) 210 may include processors developed by ARM®, MIPS®, AMD®, Intel®, Qualcomm®, and the like. In certain implementations, processor(s) 210 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by processor(s) 210 may be stored on a computer-readable storage medium, for example, in the form of a computer program.

Server 200 also has a high speed link 220, which links processor(s) 210 with a set of adapter devices including, for example, adapter devices 230, 232, and 270. High speed link 220 can be, for example, PCIe links. Adapter devices 230 and 232 can provide processor(s) 210 access to certain hardware resources including, for example, internal storage, networking resources, etc. For example, adapter devices 230 and 232 can each be configured as a Non-Volatile Memory Express (NVME) bridge between processor(s) 210 and a non-volatile storage media (e.g., a solid state drive). Each of adapter devices 230 and 232 can also be a network interface card (NIC) that provides network connectivity to another device. Adapter devices 230, 232, and 270 may include a set of configuration registers accessible to high speed link 220. The registers may be mapped to a set of memory spaces of server 200, and processor(s) 210 can communicate with each of adapter devices 230, 232, and 270 by accessing the set of memory spaces. The memory mapping may comprise a set of configuration information, such as virtual to physical memory address translation table, memory address to register translation table, etc. These information can be stored in, for example, a non-volatile memory device accessible by a memory controller that manages the server memory. Through processor(s) 210, a client device can access the hardware resources via high speed link 220 and adapter devices 230, 232, and 270. As to be described in more details below, adapter devices 230 and 232 can form an adapter device network 234. The adapter devices 230, 232 may each be the same type of device, or they may be different types of devices.

In some implementations, server 200 may include a second processor, such as a baseboard management controller (BMC) 240 for managing the operation of server 200 in accordance with, for example, the Intelligent Platform Management Interface (IPMI) standard. The IPMI subsystem on the motherboard of server 200 may include BMC 240 as the main controller, and other embedded controllers (not shown in FIG. 2) distributed among different system modules. The embedded controllers may be connected to BMC 240 via an interface, such as, for example, an Intelligent Platform Management Bus/Bridge (IPMB) interface—an enhanced implementation of Inter-Integrated Circuit ($I^2C$) interface. BMC 240 may include a processing logic that monitors the physical states of server 200 using sensors controlled by the embedded controllers. Different types of sensors may be built into server 200 and controlled by the embedded controllers. The sensors may measure internal physical parameters, such as temperature, humidity, power-supply voltage, fan speeds, communications parameters, and operating system functions, and report to BMC 240. BMC 240 may monitor the sensors and send alerts to a system administrator via the network if any of the parameters does not stay within preset limits, indicating a potential failure or risk of the system.

BMC 240 may provide management and monitoring capabilities independently of processor(s) 210, the firmware (e.g., Basic Input/Output System (BIOS)), and the operating system of server 200. BMC 240 may be used by system administrators for monitoring and managing the operations of server 200, using, for example, IPMI interfaces. For example, a system administrator may, using BMC 240 through IPMI interfaces, manage a server that may be powered off or otherwise unresponsive through a network connection to BMC 240, or login independent of the operating system to manage server 200 remotely even in the absence of an operating system or a system management software. System administrators may use BMC 240 to monitor status of server 200, such as temperatures, voltages, fans, power supplies, and chassis intrusion; identify devices and query real-time inventory information of server 200; review hardware logs; or take some corrective actions, for example, performing recovery procedures such as resetting or rebooting server 200 to get a hung operating system running again or power down server 200 if necessary. In this way, a system administrator can remotely manage numerous servers and other devices simultaneously, saving on the overall operating cost of the network and helping to ensure its reliability. BMC 240 may include a network interface 250 which allows it to communicate with other components of server 200, and with the administrator, via an internal management network 260, the details of which are to be discussed below.

Server 200 further includes adapter device 270 and one or more network ports 280. Adapter device 270 may be a standalone device soldered on a motherboard of server 200, and may include a network switch 272, one or more network ports 274, and a processor (not shown in FIG. 2) that manages the operations of network switch 272. Network switch 272 may communicate with, for example, network interface 250 via a high speed bus 282. The one or more network ports 280 can also be soldered on a motherboard of server 200, and may communicate with various components of adapter device 270 (e.g., network switch 272) via high speed bus 284. Both high speed buses 282 and 284 may be capable of transmitting Gigabit Ethernet traffics. The one or more network ports 280 may be coupled with adapter device network 234 (which includes adapter devices 230 and 232).

The one or more network ports 274 of adapter device 270 may be coupled with networks external to server 200. In the example of FIG. 2, the external networks may provide a medium for communication between the server and other devices. The communication may be associated with, for example, management of operations of various components of server 200, configuring the components of server 200, accessing the hardware resources provided via adapter devices 230 and 232, etc. For example, as shown in FIG. 2, the external networks may include a management service network 276 and a data network 278. Management service network 276 may provide a communication channel for configuring the components of the server such as, for example, managing the server memory space mapping to the configuration registers of adapter devices 230 and 232. On the other hand, data network 278 may provide data plane and control plane communication between server 200 and an external agent (e.g., a client device, and administrator, etc.). Data network 278 may be managed by an operator and/or administrator of server 200. Through data network 278, a client device may interact directly with processor(s) 210 to access hardware resources (e.g., internal storage space through adapter devices 230 and 232 configured as NVME bridges) via high speed link 220. Also, through data network 278 (and/or management service network 276), a system administrator may transmit, via data network 278, instruction to BMC 240 to request for status data of server 200, such as temperatures, voltages, fans, power supplies, and chassis intrusion, to identify devices and query real-time inventory information of server 200, and to review hardware logs. The system administrator may also transmit, via data network 278 (and/or management service network 276), instructions for performing recovery procedures such as resetting or rebooting server 200 to get a hung operating system running again or power down server 200. The system administrator may also receive, for example, status data from BMC 240 via data network 278 and/or management service network 276.

BMC 240 and adapter device network 234, together with adapter device 270, may form an internal management network 260 that allows packetized communication of management and configuration data among these components, and between these components and external networks (e.g., management service network 276 and data network 278). Adapter device 270 can be configured as a master adapter device, with network switch 272 of adapter device 270 capable of routing network packets to enable communications among BMC 240, management service network 276, data network 278, and adapter device network 234. For example, network 272 may be configurable to be coupled with various hardware components of server 200 (e.g., network interface 250 of BMC 240, network port(s) 274 and 280, etc.) to perform the routing. Moreover, adapter device 270 can be configured as a gateway device to regulate access to internal management network 260.

Internal management network 260 may operate any known network protocol such as, for example, Transmission Control Protocol (TCP), User Datagram Protocol (UDP), etc. Within internal management network 260, each connected device (e.g., BMC 240, adapter devices 230, 232, and 270, etc.) may be assigned an address. Such address can be, for example, a media access control (MAC) address. In some implementations, the devices can broadcast their addresses by transmitting a broadcasting message within the internal management network. Devices with network switch and network packet routing capabilities (e.g., adapter devices 230, 232, and 270) may intercept the message, and map a network port to an address. The mapping information can then be used to route network packets to and from those devices. In some implementations, the devices can also perform handshakes with each other to discover their addresses.

Network switch 272 may perform, under the control of one or more processors of adapter device 270, the routing functions to enable communications related to management and configuration of various components of server 200. For example, the processors of adapter device 270 may receive, via network ports 274, network packets including instructions from management service network 276, and control network switch 272 to forward the network packets with instructions to network interface 250 of BMC 240. The processors of adapter device 270 may also receive network packets including monitor data from BMC 240, and control network switch 272 to forward the network packets with monitor data to management service network 276 (and/or data network 278) via network ports 274. The processors of adapter device 270 may also receive, from adapter device network 234 and via network ports 280, network packets including monitor data (e.g., log data, status data, etc.) associated with hardware and/or software resources. The processors of adapter device 270 can control network switch 272 and forward the network packets with monitor data to BMC 240. BMC 240 can then transmit network packets including the received monitor data to management service network 276 (and/or data network 278), via network switch 272 and network ports 274. The processors of adapter device 270 may also receive network packets from BMC 240 including instructions to, for example, reset adapter devices 230 and/or adapter devices 232, and control network switch 272 to forward the network packets to adapter device network 234 via network ports 280 to reset those adapter devices.

In addition, adapter device 270 may also be part of a network interface between processor 210(s) and the customer devices, and can be involved in the provisioning of hardware resources to the customer devices via data network 278. For example, adapter device 270 may receive, from a client device associated with a customer, network packets containing access requests for hardware resource from data network 278. Adapter device 270 can communicate the access requests to processor(s) 210 via, for example, high speed link 220 (e.g., by writing the requests to a memory space accessible by processor(s) 210 via the high speed link). Processor(s) 210 can then transmit the requests to adapter devices 230 and/or 232, and receive the requested hardware resources (e.g., data stored in internal storage), via high speed link 220. Adapter device 270 may also receive the requested hardware resources via high speed link 220, and network switch 272 can be configured to transmit network packets including the requested hardware resources to the client device via network ports 274 and data network 278.

Adapter device 270 may also be configured to implement a set of pre-determined forwarding policies to, for example, improve security. For example, adapter device 270 may examine the source address of the network packets, and allow network packets to enter internal management network 260 only if the network packets are sent by a trusted entity (e.g., an administrator of server 200). Adapter device 270 can isolate internal management network 260 from, for example, a client who is granted bare-metal access to server 200. For example, adapter device 270 can be configured to never allow network packets originated from a customer device to enter internal management network 260. For example, the processors of adapter device 270 can control network switch 272 not to release network packets originated from a customer device into high speed bus 282 (which is coupled with BMC 240) or into high speed bus 284 (which is coupled with network ports 280 and adapter device network 234). With such arrangements, adapter device 270 may prevent network packets sent by the client from entering internal management network 260.

Adapter device 270 can also regulate the flow of network packets within internal management network 260. For example, adapter device 270 may be configured to forward monitor data from adapter device network 234 to BMC 240 (and/or to management service network 276). On the other hand, adapter device 270 may be configured to block other types of data from adapter device network 234 from reaching BMC 240. For example, adapter devices 230 and 232 may be prohibited from issuing an instruction to BMC 240 to reset server 200, to mitigate the potential threat of, for example, a malicious client using the adapter devices to shut down server 200, or to cause other types of harm to other clients using server 200. If adapter device 270 detects that any one of adapter devices 230 and 232 transmits network packets including an instruction to BMC 240, adapter device 270 may drop those network packets. Adapter device 270 may also transmit a notification to, for example, management service network 276 to report the reception and dropping of the network packets. Adapter device 270 may also be configured to allow, for example, only a specific set of agents in data network 278 and management service network 276 to transmit instructions to BMC 240 and to receive status data from BMC 240, to transmit configurations to adapter device network 234, etc.

Figure 3:
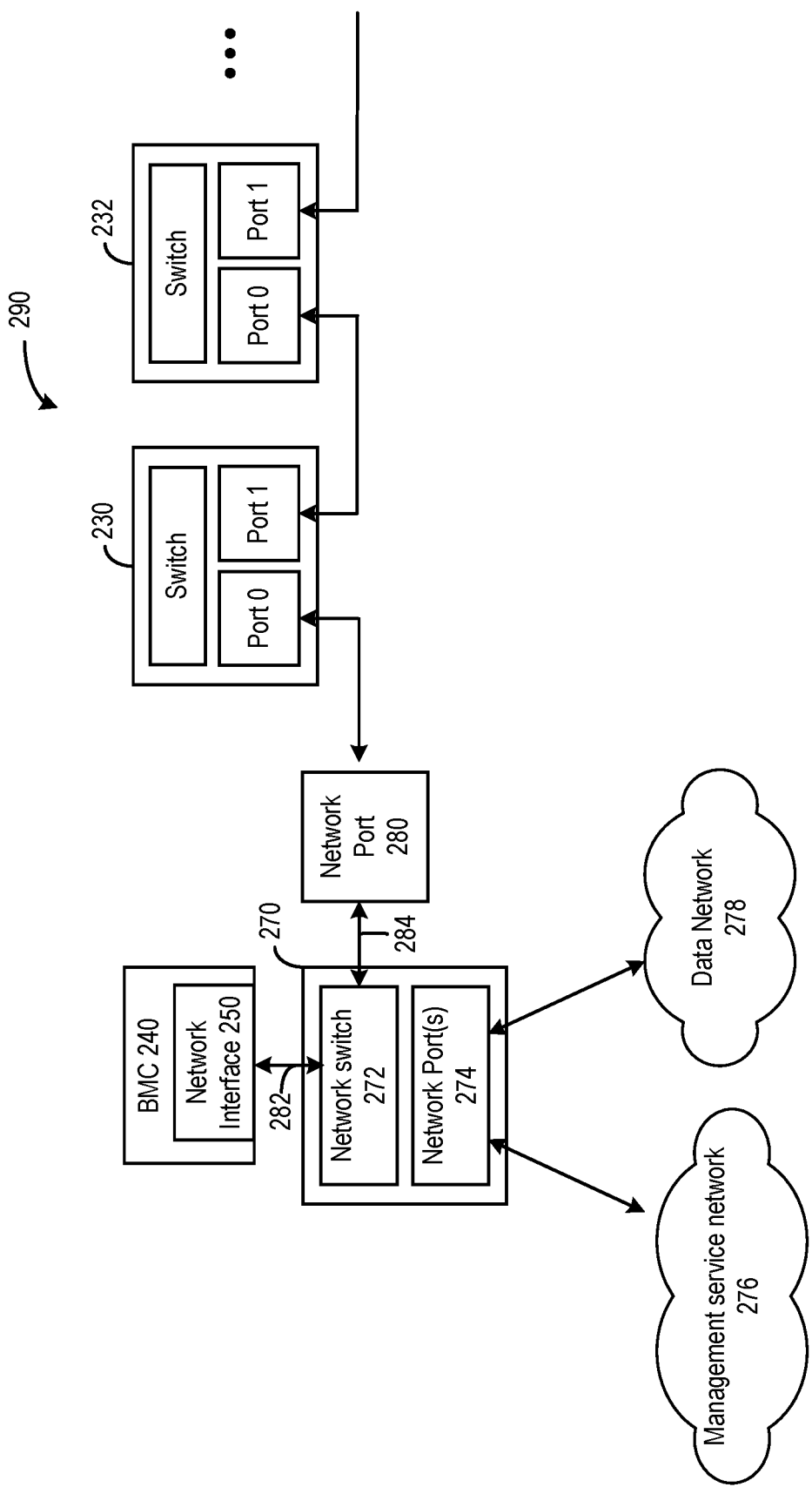
FIGS. 3 and 4 illustrate examples of an adapter device network, according to certain aspects of the present disclosure.
Figure 4:
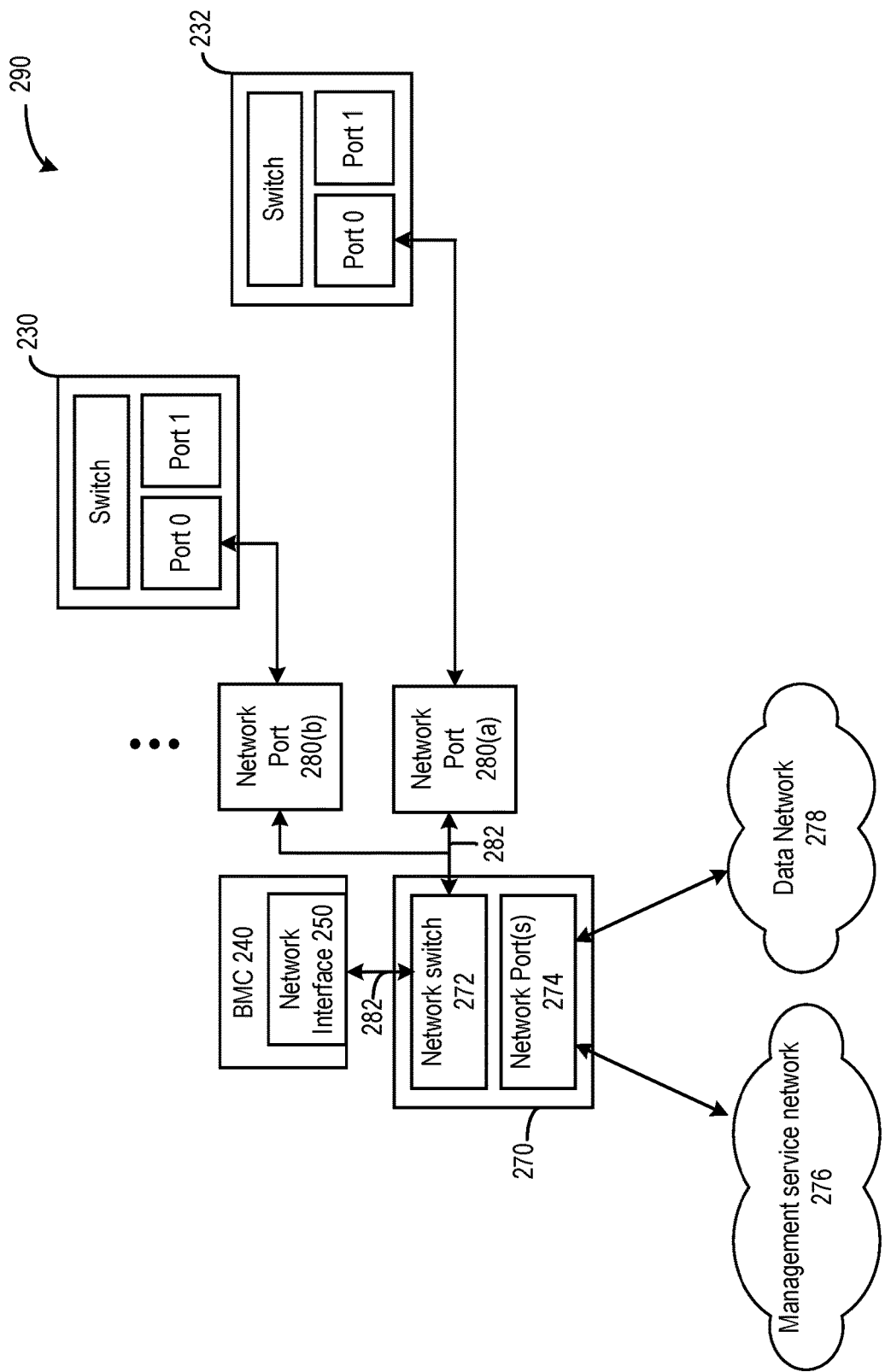

In some implementations, to further improve security and transmission speed, the internal server network can implemented as a wired network. For example, network ports 274 and network ports 280 can include Ethernet ports, and network ports 280 can be coupled with adapter device network 234 via an Ethernet cable. Adapter device network 234 can also be Ethernet networks and with different topologies. As an example, referring to FIG. 3, within adapter device network 234, adapter devices 230 and 232 may be coupled with each other with an Ethernet cable, and one of adapter devices 230 and 232 may be coupled with a network port of network ports 280 with another Ethernet cable, to form a chain topology. As another example, referring to FIG. 4, each of adapter devices 230 and 232 may be coupled with different network ports of network ports 280, to form a star topology. As to be discussed in more details below, each of adapter devices 230, 232, and 270 may be configured to forward the network packets based on the topology, in addition to the aforementioned forwarding policies.

In some embodiments, adapter devices 230, 232, and 270 may also be configurable (e.g., by management service network 276) to operate under either a hypervisor mode or a bare-metal mode, which may determine whether internal management network 260 is used to transmit configuration and management data among the components of server 200. For example, when operating under a hypervisor mode, the hypervisor manages access to the memory space of the server for each of adapter devices 230, 232 and 270, and those devices can transmit configuration and management data to each other via memory space writing. On the other hand, under the bare-metal mode, the memory space management capability by the hypervisor may be unavailable, and adapter devices 230, 232, and 270 may transmit configuration and management data using internal management network 260.

In some implementations, each of adapter devices 230, 232, and 270 may include for example, a processor, non-volatile memory (e.g., flash memory), volatile memory (e.g., RAM), a network switch (e.g., network switch 272 for adapter device 270), one or more network ports (e.g., network ports 274 for adapter device 270), and other interface circuits. For example, some or all of each of adapter devices 230, 232, and 270 may include multiple SoC (system-on-chip) devices with embedded microprocessors to execute computer executable instructions related to, for example, processing of network packets (e.g., TCP and UDP packets), generating and processing messages (e.g., Hypertext Transfer Protocol (HTTP) messages, Constrained Application Protocol (CoAP) messages, etc.), implementing the aforementioned forwarding policies, etc. These adapter devices may include communication interfaces between the multiple SoCs, between the SoCs and the network switch, etc. The communication interfaces may include, for example, Gigabit Ethernet interfaces, Peripheral Component Interconnect (PCI) interfaces, PCI Express (PCIe) interfaces, PCI Extended (PCI-X) interfaces, or any other suitable interfaces. Adapter devices 230 and 232 may also include an interface (e.g., PCIe interface) to communicate with high speed link 220 for provisioning of bare-metal resources to processor(s) 210.

Although not shown in FIG. 2, adapter devices 230, 232, and 270 may include other components or modules or remote access to said components or modules, such as mass storage controllers, network controllers, display controllers, memory controllers, serial bus controllers, wireless controllers, or encryption and decryption controllers, among others. For example, the adapter devices may include a non-volatile memory that stores firmware that can be executed by a processor to cause components of the adapter devices to initialize and identify modules of the adapter devices. The non-volatile memory may also include boot loader software that will be utilized to boot the adapter devices. The non-volatile memory may also include firmware that may be used to configure and boot adapter devices for performing different hardware functionalities based on, for example, access requests from the clients, requests from BMC 240 for monitoring data, to operate under the hypervisor mode or bare-metal mode, etc. In some embodiments, the non-volatile memory may include a flash memory.

Moreover, although FIG. 2 illustrates adapter devices 230, 232, and 270 as standalone devices, it is understood that the adapter devices can also be merged with a motherboard of server 200. For example, components of adapter device 270 including network switch 272 and network ports 274, as well as the processor of adapter device 270 (not shown in FIG. 2), can be directly soldered onto the motherboard of server 200. The same motherboard may also include network ports 280, as well as components of adapter devices 230 and 232.

Moreover, although not shown in FIG. 2, server 200 may include other components or modules. For example, in some embodiments, server 200 may include a memory module, which may include, for example, a random access memory (RAM), dynamic random access memory (DRAM), or a synchronous dynamic random-access memory (SDRAM), such as double data rate (DDR), DDR2, DDR3, or DDR4 SDRAM. The memory module may provide, for example, memory spaces mapped to configuration registers to adapter devices 230 and 232 and accessible by processor(s) 210. In some embodiments, the memory module may include several levels of cache hierarchy, such as Level 1 (L1) caches, Level 2 (L2) caches, Level 3 (L3), or last level caches. As discussed above, the memory mapping can be configured based on configuration data from management service network 276.

Figure 5:
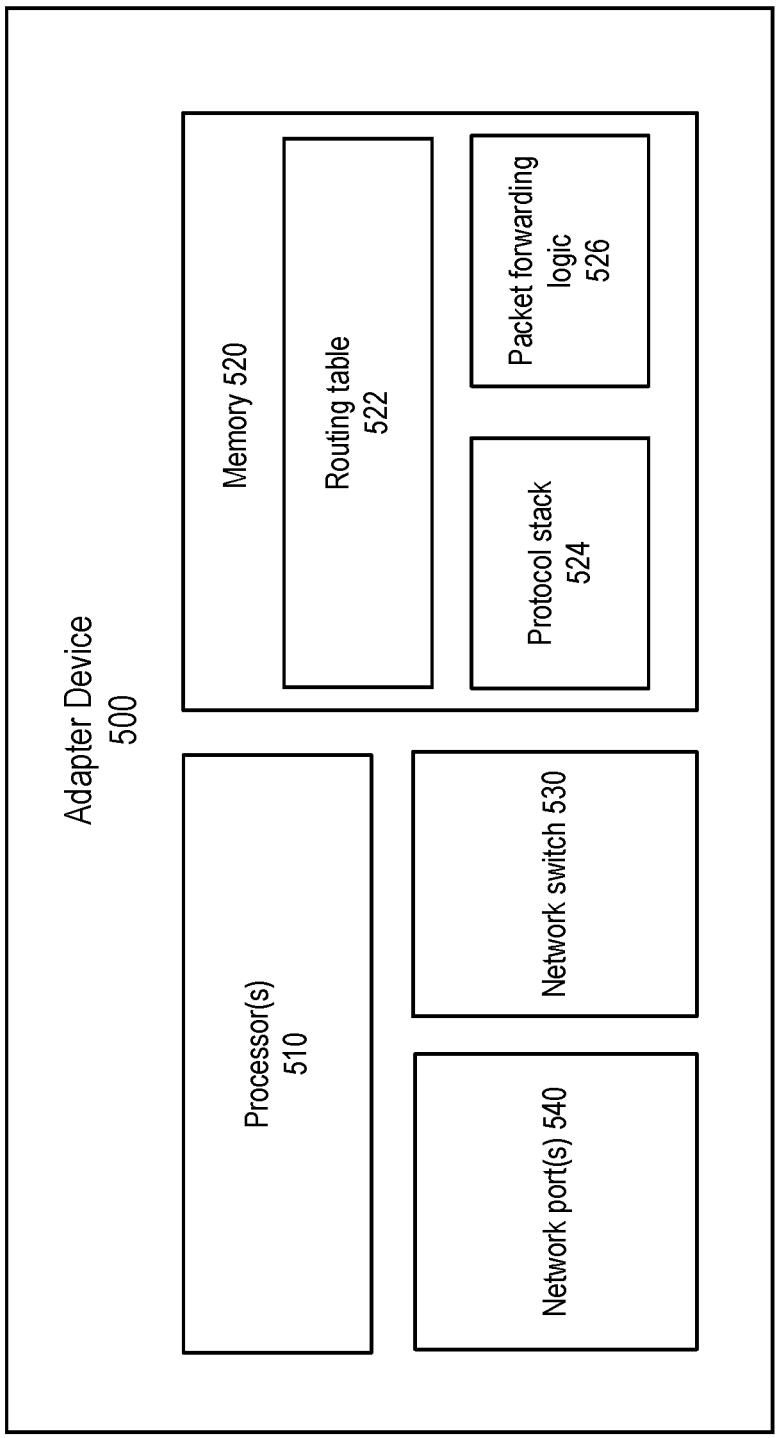
FIG. 5 is a simplified block diagram of an adapter device, according to certain aspects of the present disclosure.

FIG. 5 is a simplified block diagram of an adapter device 500, according to certain aspects of the present disclosure. FIG. 5 is for illustration purpose only and is not meant to be limiting. The illustrative functional blocks of adapter device 500 may be logical in nature such that the physical implementation of one or more functional blocks can be varied or such that one or more of the logical components may be implemented in a virtualized manner. In various implementations, some of the illustrated functional blocks may be omitted, combined with other functional blocks, or split into multiple functional blocks, without deviating from the scope of the disclosure. Adapter device 500 may be, for example, adapter devices 230, 232, or 270 of FIG. 2.

In some embodiments, adapter device 500 may include one or more processors 510, a memory 520, a network switch 530, and one or more network port(s) 540. Processor(s) 510 may be part of an SoC, and can execute instructions stored in non-volatile memory 520 to perform one or more methods disclosed herein. Memory 520 may store instructions to be executed to processor(s) 510, as well as data to be used by processor(s) 510 when executing the instructions. In the example of FIG. 5, memory 520 may store routing table 522, protocol stack 524, and packet forwarding logic 526. Memory 520 may include non-volatile memory devices (e.g., hard drive, flash memory, ROM, etc.) as well as volatile memory devices (e.g., SRAM, DRAM, etc.). For execution by processor(s) 510, data and instructions corresponding to routing table 522, protocol stack 524, and packet forwarding logic 526 can be copied from non-volatile memory devices to the volatile memory devices. Processor(s) 510 can then obtain the data and instructions from the volatile memory devices for execution.

Routing table 522 may provide routing information for adapter device 500 to forward network packets through the internal management network. For example, routing table 522 may store a mapping between each of the ports of network port(s) 540 and one or more addresses. The address information may be obtained from, for example, broadcasting messages, or by handshake with individual devices, as discussed above. The one or more addresses belong to devices that are to receive network packets from the associated port, and can be specific to the topology of the network, and the location of the adapter device within the network. As an example, a routing table of adapter device 270 of FIG. 2 may store a mapping between network ports 280 and the MAC addresses of adapter devices 230 and 232. When adapter device 270 receives a network packet with a destination address identical to the MAC address of one of adapter devices 230 and 232, adapter device 270 may transmit the network packets to network ports 280. Moreover, in a case where adapter devices 230 and 232 are connected in a chain topology as in FIG. 3, adapter device 230 may store a mapping table that maps the network port labelled with "port 1" with the MAC address of adapter device 232, so that adapter device 230 may forward a network packet addressed to adapter device 232. On the other hand, devices that are not to transmit or receive network packets via the internal management network (e.g., processor(s) 210 of FIG. 2) are not included in routing table 522.

Protocol stack 524 may include instruction codes for implementing a network protocol (e.g., TCP, UDP, etc.), a message protocol (e.g., HTTP, CoAP, etc.), as well as protocols for interfacing with other hardware components (e.g., high speed link 220 and processor(s) 210 of FIG. 2). For example, protocol stack 524 can extract the destination address and source address from a network packet header. Protocol stack 524 can also extract certain information from the message being transmitted (as network packets) including, for example, a message identifier and a message payload (e.g., of a CoAP message). Protocol stack 524 can provide the address and message information to packet forwarding logic 526 to perform packet forwarding. Moreover, in a case where the network packets include hardware resource access requests from a customer, protocol stack 524 can also extract the requests information and communicate that to the server processor (e.g., processors 210).

Packet forwarding logic 526 may include a set of instructions that define how network packets are to be forwarded, and can configure network switch 530 to implement the forwarding decisions. For example, absent any special rules or restrictions, packet forwarding logic 526 may refer to routing table 522 to determine a port (of network port(s) 540) for forwarding a network packet. Packet forwarding logic 526 can then provide the network packet to network switch 530, and control network switch 530 to transmit the network packet to the determined port in network port(s) 540.

Moreover, packet forwarding logic 526 may also implement a set of predetermined packet forwarding policies, similar to the ones described above, to improve security. For example, packet forwarding logic 526 may block adapter devices 230 and 232 from sending instructions to BMC 240 to reset server 200. To carry out this policy, packet forwarding logic 526 can monitor for network packets with a destination address that matches the MAC address of BMC 240, a source address that matches one of adapter devices 230 or 232, and message payload/identifier associated with a reset instruction. If all these conditions are met, packet forwarding logic 526 can also determine to drop the packet. Packet forwarding logic 526 may generate a notification message about the packet, and transmit the notification message to, for example, management service network 276.

As another example, packet forwarding logic 526 may block customer devices from sending data or instruction to different components of the server (e.g., adapter devices 230 and 232, BMC 240, etc.). To carry out this policy, packet forwarding logic 526 can monitor for network packets with a source address that is not in the list of trusted agents authorized to send network packets to the server components. If the destination address of those packets are directed to certain components of the server connected to internal management network 260 (e.g., BMC 240, adapter device network 234, etc.). Packet forwarding logic 526 may perform a set of predetermined processing procedures. For example, packet forwarding logic 526 may drop the network packets. As another example, packet forwarding logic 526 may generate a notification message about the network packets, and transmit the notification message to, for example, management service network 276.

Network switches 530 may comprise a set of configurable hardware for routing network packets to different ports of network port(s) 540. For example, network switches 530 may include a set of configurable multiplexer circuits for directing packet data to different ports of network port(s) 540, under the control of packet forwarding logic 526. In some implementations, network switch 530 can be a part of an SOC that also includes processor(s) 510. Network port(s) 540 comprise the hardware (e.g., connectors, circuitries, etc.) for receiving and transmitting network packets. Each of network port(s) 540 may include a physical Ethernet port and a queue for storing received packets waiting to be processed by protocol stack 524 and packet forwarding logic 526, and for storing packets received from packet forwarding logic 526 for transmission.

Figure 6:
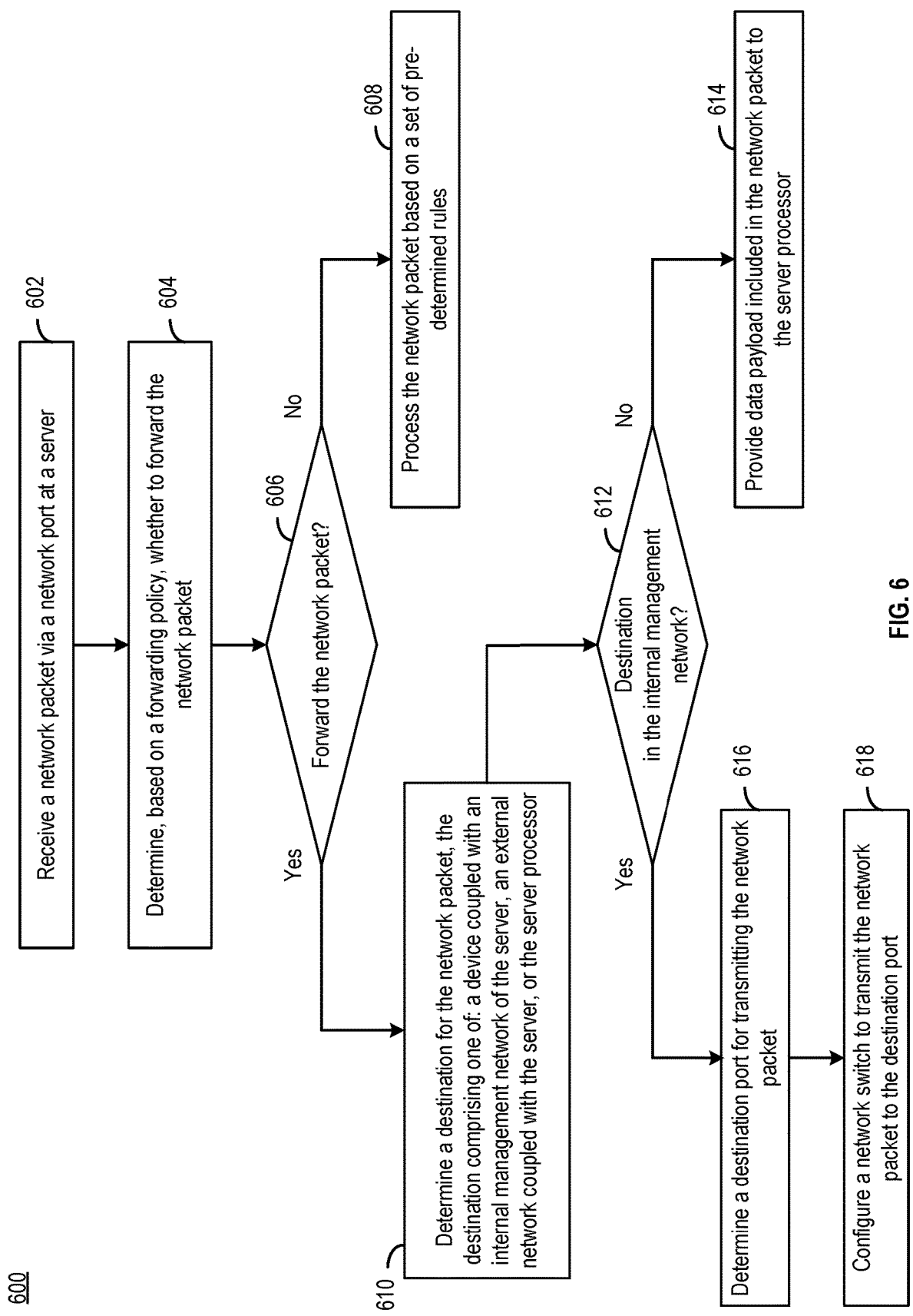
FIG. 6 illustrates an example flow diagram of a process for securing a server in a compute service system by an adapter device, according to certain aspects of the present disclosure.

FIG. 6 illustrates an example flow diagram of a process 600 for securing a server in a compute service system by an adapter device coupled with a server, according to certain aspects of the present disclosure. The process may be implemented by various systems described above, such as, for example, adapter device 270 of FIG. 2 and adapter device 500 of FIG. 5.

At operation 602, the adapter device receives a network packet via a network port (e.g., network port(s) 540).

At operation 604, the adapter device determines, based on a forwarding policy, whether to forward the network packet. In some embodiments, the forwarding policy is provided by an administrator of the compute service system. The forwarding policy may include, for example, not forwarding instruction messages from adapter device network 234 to BMC 240, not allowing messages from a client device to enter internal management network 260, etc. The adapter device may make the determination based on, for example, a source address and a destination address of the network packet, as well as an identifier or payload of the message extracted from the network packet. Referring to one of the examples described above, if the network packet includes an instruction for BMC 240 to reset the server, and the network packet originates from adapter device network 234, the adapter device may drop the network packet.

If the adapter device determines not to forward the network packet (at operation 606), the adapter device may process the network packet based on a set of pre-determined rules, at operation 608. For example, the adapter device may drop the network packet. As another example, the adapter device may transmit a notification message (e.g., to management service network 276) to provide a notification about the network packet. In some embodiments, the rules are provided by an administrator of the compute service system.

On the other hand, if the adapter device determines to forward the network packet (at operation 606), the adapter device will determine a destination for the network packet from a plurality of server hardware components including, for example, a BMC of the server (e.g., BMC 240), a network port (e.g., network port(s) 274 and 280), a device coupled with an internal management network of the server (e.g., adapter devices 230 and 232), an external network coupled with the server (e.g., management service network 276, data network 278, etc.), the server processor (e.g., processor 210), or another destination, at operation 610. For example, if the network packet contains management service data and instruction, the adapter device may determine a destination for the network packet within the internal management network. On the other hand, if the network packet contains a hardware resource access request from a customer, the adapter device may transmit the network packet to the server processor (e.g., via high speed link 220) to process the access request. The determination of the destination can be based on, for example, a destination address of the network packet, or on a configurable set of rules.

At operation 612, the adapter device determines whether the destination of the network packet (determined at operation 610) is in the internal management network. The determination can be based on, for example, a routing table that lists a set of device MAC addresses and the network ports for forwarding a packet to the set of devices (e.g., routing table 522). If the destination address of the network packet is not in the routing table (or that the destination address satisfies certain criteria, such as matching the MAC address of the adapter device, the server, etc., as determined in operation 610), the adapter device may determine that the destination is not in the internal management network, and may provide the data payload included in the network packet to the server processor, at operation 614.

On the other hand, if the adapter device determines that the destination of the network packet is in the internal management network (at operation 612), the adapter device may refer to the routing table to determine a destination port (e.g., of network port(s) 274 of FIG. 2, of network port(s) 540 of FIG. 5) for forwarding the network packet, at operation 616. The adapter device can then configure a network switch (e.g., network switch 272 of FIG. 2, network switch 530 of FIG. 5) to transmit the network packet to the destination port, at operation 618.

Even though FIG. 6 describes an example process as operations, an operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 7:
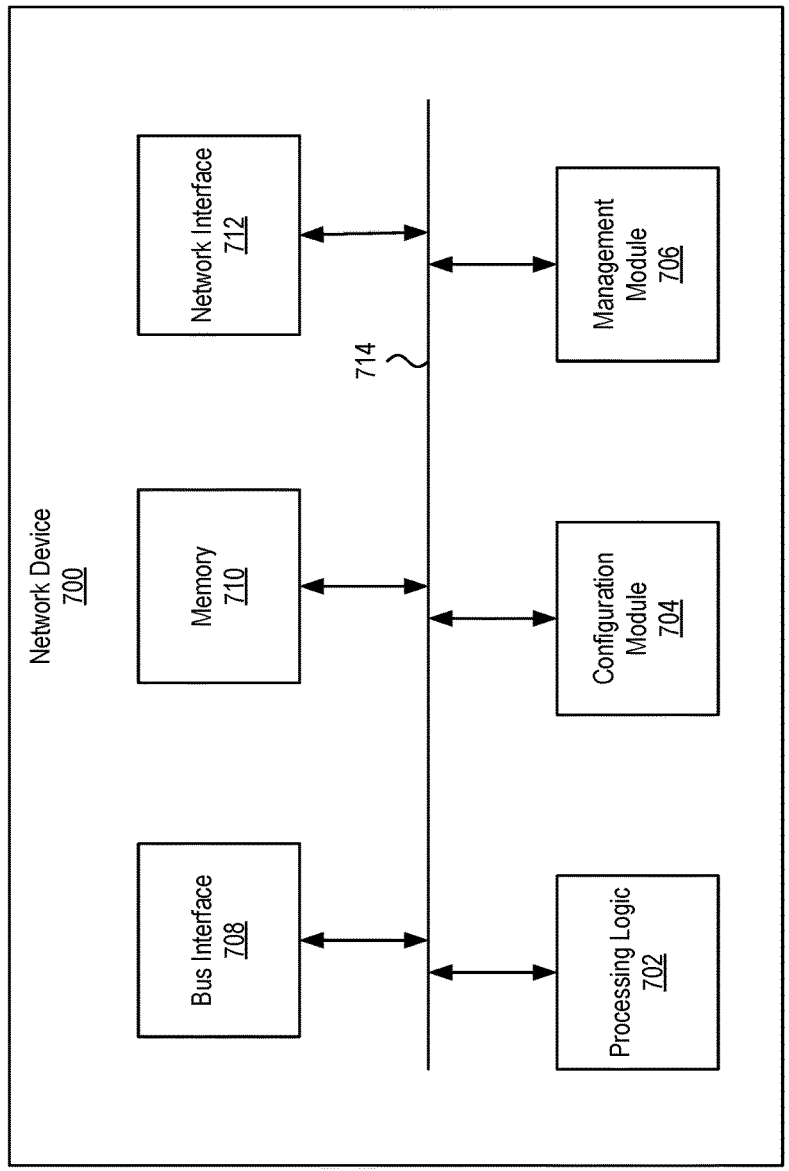
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets. Adapter devices 230, 232, 270, and 500 can be implemented as network device 700.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700. Memory 710 may store, for example, routing table 522, protocol stack 524 and packet forwarding logic 526 of FIG. 5, and may provide the stored instructions and data to processing logic 702 to perform one or more methods disclosed herein.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
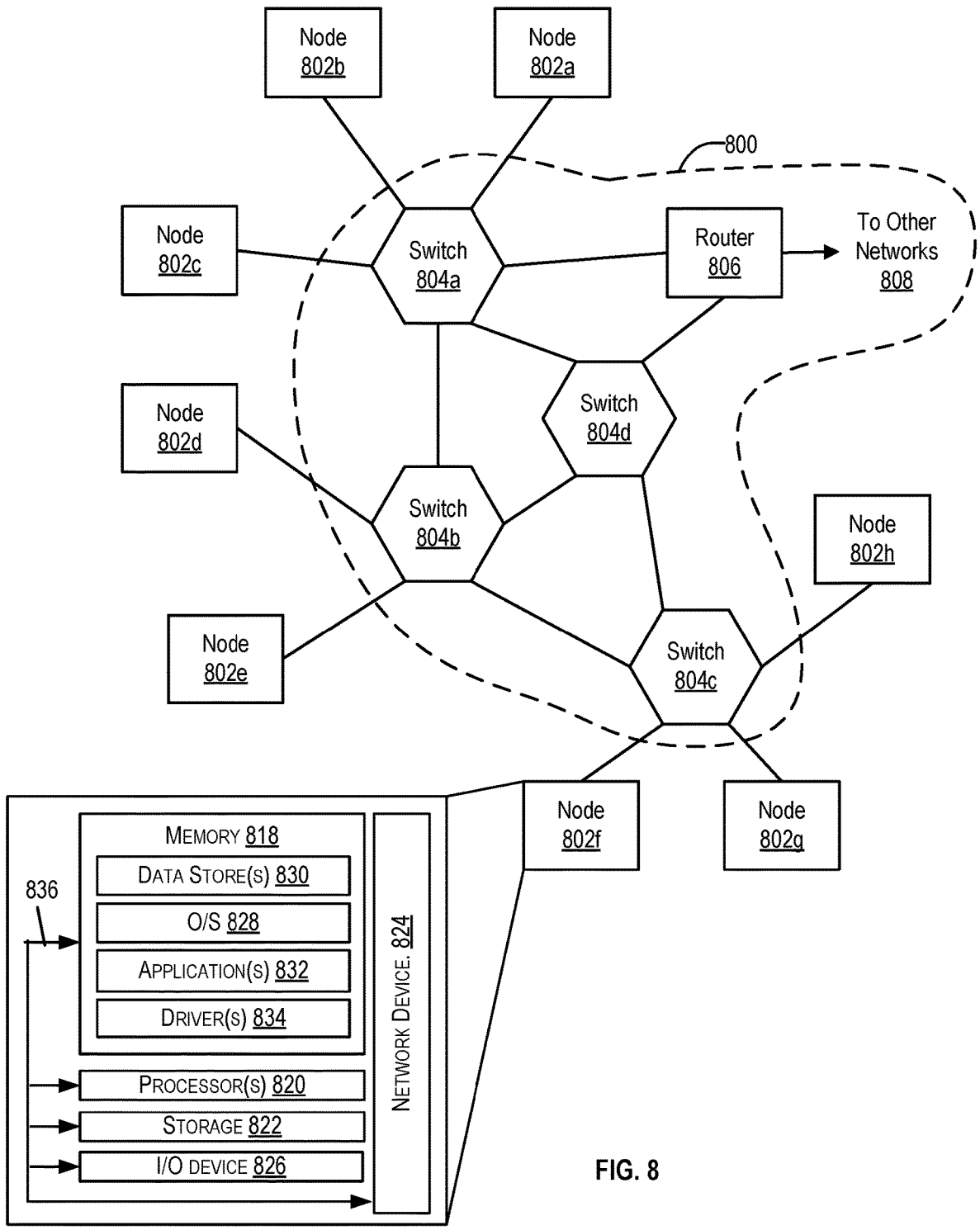
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers. For example, server 200 can be one of nodes 802a-802h.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specifications and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server comprising:
 a hardware processor;
 a baseboard management controller (BMC) configured to perform management operations and monitoring operations of the server;
 a first Ethernet port coupled with an adapter device network comprising a plurality of adapter devices, each of the plurality of adapter devices being coupled with the hardware processor via a high speed link;
 a master adapter device coupled with the hardware processor via the high speed link and including a second Ethernet port and a network switch, the network switch being controllable to be selectively coupled with the BMC, the first Ethernet port, or the second Ethernet port;
 wherein the second Ethernet port is coupled with an external network;
 wherein the BMC, the master adapter device, and the adapter device network form an internal management network;
 wherein the master adapter device is configured to regulate:
  receive a network packet from the first Ethernet port, the second Ethernet port, or the BMC;
  determine, based on applying a forwarding policy on the network packet, whether to forward the network packet to a destination via the internal management network, wherein the forwarding policy defines first rules for external access to the internal management network and second rules for transmission of network packets within the internal management network; and
  based on a determination to forward the network packet via the internal management network and based on a destination address in the network packet, controlling the network switch to transmit the network packet to one of the first Ethernet port, the second Ethernet port, or the BMC via the internal management network.

2. The server of claim 1,
wherein the second rules for transmission of network packets within the internal management network define that the plurality of adapter devices of the adapter device network cannot transmit network packets including an instruction related to the management operations of the BMC to the BMC via the internal management network; and
wherein the master adapter device is configured, after receiving another network packet from the adapter device network, not to forward the another network packet based on the another network packet including the instruction, a source address of the another network packet being associated with an adapter device of the adapter device network, and a destination address of the another network packet being associated with the BMC.

3. The server of claim 1,
wherein the second rules for transmission of network packets within the internal management network define that the plurality of adapter devices of the adapter device network can transmit network packets related to the monitoring operations of the BMC to the BMC via the internal management network;
wherein the network packet is received from the adapter device network via the first Ethernet port and includes status data for the monitoring operations of the BMC; and
wherein the master adapter device is configured to forward the network packet based on the network packet including status data to support the monitoring operations, a source address of the network packet being associated with an adapter device of the adapter device network, and a destination address of the network packet being associated with the BMC.

4. The server of claim 1,
wherein the first rules for external access to the internal management network define that an external client device that interacts with the hardware processor to access hardware resources provided via the adapter devices network cannot access the internal management network; and
wherein the master adapter device is further configured, after receiving another network packet from the external network via the second Ethernet port, to block the another network packet from reaching the BMC or the first Ethernet port via the internal management network based on the another network packet being transmitted from an external client device that interacts with the hardware processor to access hardware resources provided via the adapter devices network.

5. The server of claim 4, wherein the master adapter device is further configured to provide data included in the another network packet to the hardware processor via the high speed link.

6. The server of claim 1,
wherein the first rules for external access to the internal management network define that only a trusted agent authorized to transmit network packets to the BMC can transmit the network packets from the external network via the internal management network to the BMC; and
wherein the master adapter device is further configured, after receiving another network packet from the external network via the second Ethernet port, to block the another network packet from reaching the BMC based on the another network packet being addressed to the BMC and not transmitted from the trusted agent.

7. The server of claim 1, wherein the master adapter device is configured to:
receive another network packet from the BMC via the internal management network; and
forward the another network packet to a management service network that is part of the external network.

8. The server of claim 1, wherein the master adapter device is configured to:
receive another network packet from one of the plurality of adapter devices via the internal management network; and
forward the another network packet to an external client device via the external network.

9. A device comprising:
a hardware processor;
a first port, the first port being configurable to be coupled with an external network;
a network switch, the network switch being configurable to be coupled with a first hardware component and a second hardware component of a server to form an internal network on the server; and
a memory device that stores a routing table, a forwarding policy, and a set of instructions, wherein the forwarding policy defines first rules for external access to the internal network and second rules for transmission of network packets within the internal network;
wherein the hardware processor is configured to execute the set of instructions to:
receive a network packet from the first port, the first hardware component, or the second hardware component;
determine, based on applying the forwarding policy to the network packet, whether to forward the network packet to a destination via the internal network; and
based on a determination to forward the network packet via the internal network, configure, based on the routing table, the network switch to transmit the network packet via the internal network to the destination.

10. The device of claim 9, wherein:
the second rules for transmission of network packets within the internal network define that a third hardware component cannot transmit network packets to the first hardware component via the internal network to reset the server;
the second hardware component is a second port is coupled with a network of adapter devices; and
the hardware processor is further configured to execute the set of instructions to, after receiving another network packet from the second port that is addressed to the first hardware component, drop the another network packet based on a determination that the another network packet is transmitted from the third hardware component and includes an instruction to reset the server.

11. The device of claim 9,
wherein the second rules for transmission of network packets within the internal network define that network packets including status data can flow within the internal network; and
wherein the hardware processor is further configured to execute the set of instructions to forward the network packet via the internal network based on a determination that the network packet includes the status data.

12. The device of claim 9,
wherein the first rules for external access to the internal network define that only an authorized agent authorized to transmit network packets to the first hardware component can transmit the network packets from the external network via the internal network to the first hardware component; and
wherein the hardware processor is further configured to execute the set of instructions to forward the network packet via the internal network based on a determination that the network packet is received from the authorized agent and the network packet is addressed to the first hardware component.

13. The device of claim 9,
wherein the first rules for external access to the internal network define that an external client device associated with a bare-metal instance cannot access the first hardware component or the second hardware component via the internal network; and
wherein the hardware processor is further configured to execute the set of instructions to, after receiving another network packet, not forward the another network packet via the internal network based on a determination that the another network packet is received from an external client device associated with the bare-metal instance, and that the another network packet is addressed to the first hardware component or the second hardware component.

14. The device of claim 13, wherein the hardware processor is further configured to execute the set of instructions to, after receiving the another network packet, transmit a notification message to an external management service network via the first port.

15. The device of claim 9, wherein the hardware processor is further configured to execute the set of instructions to, after receiving another network packet and based on a determination that the destination of the network packet is a processor of the server, transmit data included in the network packet to the processor of the server.

16. The device of claim 9, wherein the hardware processor is further configured to execute the set of instructions to extract an Hypertext Transfer Protocol (HTTP) message or a Constrained Application Protocol (CoAP) message from the network packet, and to handle transmission and reception of the network packet based on a Transmission Control Protocol (TCP) or User Datagram Protocol (UDP) protocol.

17. The device of claim 9, wherein the first hardware component comprises a baseboard management controller (BMC) and the second hardware component comprises a second port.

18. A method, comprising:
receiving, from a port of a server, a network packet;
determining, based on a forwarding policy that defines first rules for external access to an internal management network of the server and second rules for transmission of network packets within the internal management network, whether to forward the network packet to a destination via the internal management network, and whether the network packet is addressed to a device coupled with the internal management network of the server;
based on a determination to forward the network packet via the internal management network:
determining, based on a routing table, a destination among an external network, a baseboard management controller (BMC), or a set of adapter devices that provides bare-metal resources; and
transmitting, via a network switch and via the internal management network, the network packet to the destination.

19. The method of claim 18,
wherein the first rules for external access to the internal management network define that an external client device that accesses the bare-metal resources cannot access the internal management network; and
wherein the method further comprises:
receiving another network packet; and
excluding the another network packet from the internal management network based on a determination that the another network packet is received from an external client device accessing the bare-metal resources via one of the set of adapter devices.

20. The method of claim 18,
wherein the second rules for transmission of network packets within the internal management network define that the set of adapter devices cannot transmit network packets to the BMC via the internal management network to reset the server; and
wherein the method further comprises:
receiving another network packet; and
blocking the another network packet from reaching the destination based on a determination of the another network packet being received from the set of adapter devices, the another network packet including a reset instruction, and the another network packet being addressed to the BMC.

21. The method of claim 18,
wherein the second rules for transmission of network packets within the internal management network define that network packets including sensor data can flow within the internal management network;
wherein the method further comprises:
forwarding the network packet via the internal management network based on a determination of the network packet including sensor data.

22. The method of claim 18, further comprising:
based on a determination that the destination of the network packet is a processor of the server, transmitting data included in the network packet to the processor of the server.

* * * * *